Patented Dec. 20, 1949

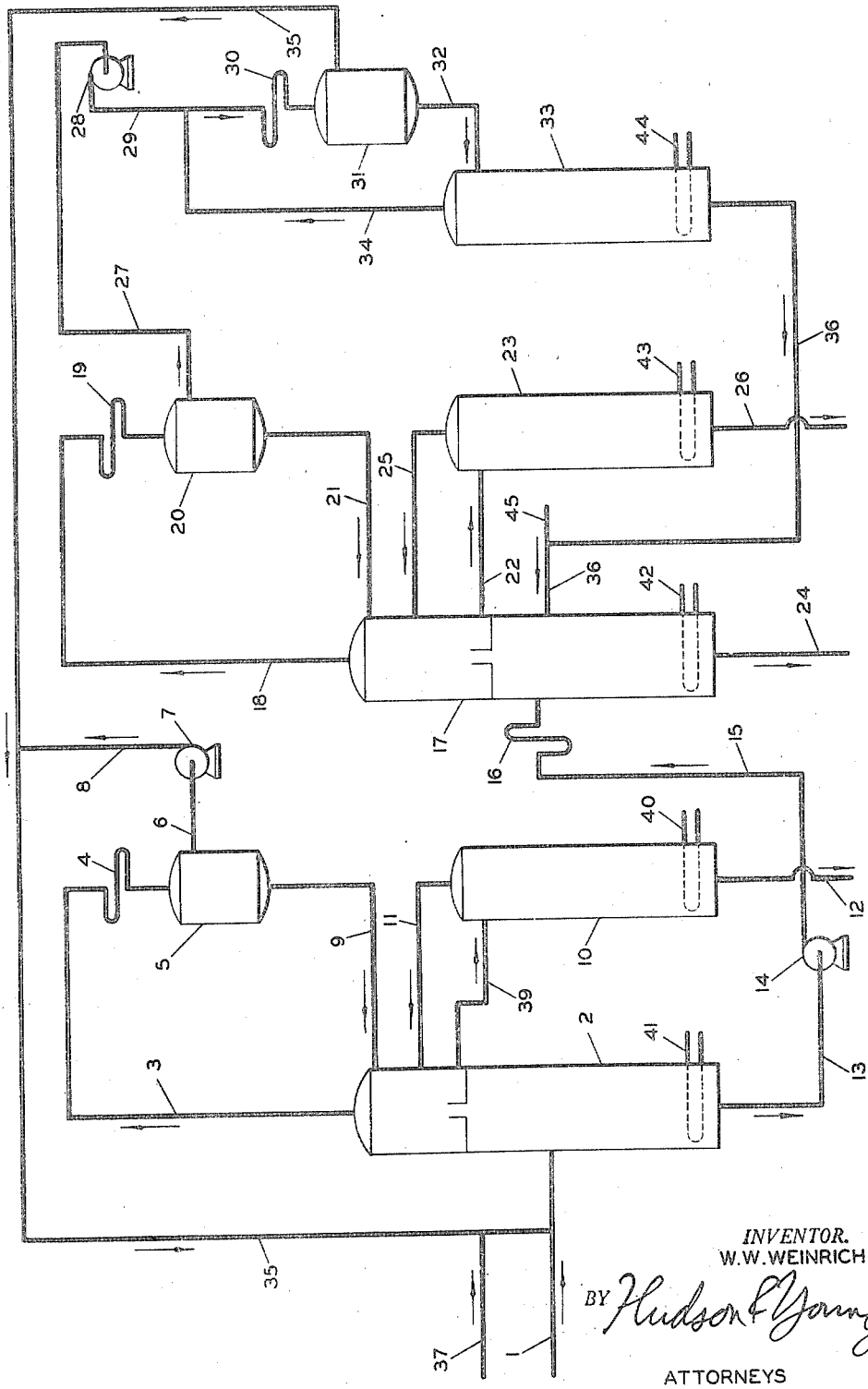

2,491,786

UNITED STATES PATENT OFFICE 2,491,786

TREATMENT OF HYDROCARBONS

William W. Weinrich, Bartlesville, Okla., assignor to Phillips Petroleum Company, a corporation of Delaware Application December 13, 1945, Serial No. 634,768

4 Claims. (Cl. 260—677)

This invention relates to the treatment of hydrocarbons. In one of its more specific aspects it relates to the separation and recovery of tertiary base olefins from hydrocarbon mixtures containing these and other hydrocarbons.

The present invention is particularly applicable to various refinery streams derived from catalytic or thermal cracking operations. The problem of extracting tertiary olefins from such materials has assumed increasing economic importance for two reasons: (1) The intrinsic value of such olefins as chemical intermediates and (2) the deleterious effect of tertiary olefins on certain types of process operations. Tertiary olefins are highly reactive and therefore have wide potential applications as comonomers in polymerization reactions and in the manufacture of synthetic rubber modifiers, antioxidants and various useful tertiary alkyl derivatives of organic compounds in the aromatic series. With respect to the purification of hydrocarbon streams, the necessity of removing isobutylene prior to conversion of normal butenes or butane-butene mixtures to butadiene is well established. The employment of anhydrous HCl in non-catalytic systems is known to the art as a selective reagent for tertiary-base olefins in the presence of primary and secondary base olefins. Thus while it is old to react olefins such as isobutylene in hydrocarbon streams with anhydrous HCl, the recovery of the olefin from the resulting chloride has not been economically feasible due to the employment of reactions wherein HCl is chemically combined in various types of compounds.

I have now found that advantage can be taken of the thermal instability of tertiary alkyl chlorides to effect substantially complete recovery of olefin and HCl by physical means. This novel separation is accomplished by thermally decomposing a selected tertiary alkyl chloride in the presence of an inert hydrocarbon of lower boiling point than the liberated olefin while continuously removing from the decomposition zone a vaporous fraction comprising diluent and HCl and a liquid fraction comprising the recovered olefin.

One object of my invention is to provide a process for the recovery of tertiary olefins of 4 or more carbon atoms per molecule from admixtures of said olefins with other hydrocarbons.

Another object of my invention is to provide a process for decomposing tertiary alkyl chlorides into tertiary olefins and HCl and concomitantly affecting a separation of the decomposition products.

Still another object of my invention is to provide a combination process for the selective recovery of tertiary olefins from hydrocarbon mixtures which involves the formation of tertiary alkyl halides and subsequent thermal decomposition of the segregated halide.

Still another object of my invention is to provide a process wherein the decomposition of a tertiary alkyl halide and the separation of the products formed are accomplished in the same vessel.

Many other objects and advantages will be apparent to those skilled in the art from a careful study of the following disclosure and attached drawing which form a part of this specification.

In the drawing the figure represents diagrammatically one form of apparatus in which the process of my invention may be practiced.

The present invention is particularly applicable to various refinery streams derived from catalytic or thermal cracking operations. In this non-catalytic reaction system tertiary olefins of relatively low molecular weight such as those containing from 4 to 8 carbon atoms, inclusive, are most amenable to treatment. While the more reactive olefins such as isobutylene react readily with HCl at low pressures, moderately elevated pressures of 20 to 100 pounds per square inch gage are ordinarily preferred for most operations. Since the hydrochlorination reactions and the distillative separation of the resulting alkyl chloride are carried out concurrently in the same tower, operating temperatures are fixed by the minimum temperature requirements for distillation at the pressures required for hydrochlorination.

In the recovery of olefin and HCl from the segregated tertiary alkyl chloride, ease of decomposition increases with increasing molecular weight of the alkyl halide. Ordinarily temperatures within the range of 200° F. to 500° F. are adequate for this purpose. To insure substantially complete decomposition of the alkyl halide and to insure that recombination of liberated olefin and HCl does not take place, the addition of an inert spacing agent boiling substantially below the liberated olefin is added at a rate equivalent to $\frac{1}{10}$–3 moles per mole of tertiary alkyl halide feed. The only limitations prevailing with respect to the selection of a spacing agent are: that it shall be inert toward HCl at the specified decomposition conditions; that it shall be condensible at cooling water temperatures under selected operating pressures; and that it shall have a boiling point at least about 20° F. below that of the olefin. Ordinarily, the readily available paraffin hydrocarbons such as propane, n-butane and n-pentane are preferred for this purpose although close-cut fractions of natural gasoline are applicable in many instances.

Referring to the drawing, the major equipment illustrated as suitable for carrying out the process of my invention is more or less standard equipment such as can be purchased from equipment manufacturers. Such equipment includes a reactor vessel 2, three stripping columns 10, 23 and 33 and a fractionator 17. Smaller equipment parts, yet important are three accumulator vessels 5, 20 and 31, three coolers 4, 19 and 30 and a heater 16. Three pumps 7, 14 and 28 are shown. In addition to these larger single items are piping members, which will be mentioned in the subsequent description of the operation. Such auxiliary apparatus as valves, pressure gauges, temperature measuring instruments, recorders, regulators and the like are not shown for purposes of simplicity. The installation and operation of such apparatus is well understood by those skilled in such art when considered in the light of the following detailed description.

In the operation of my process, an isobutylene-containing C₄ hydrocarbon stream such as is ordinarily available from refinery cracking and dehydrogenation operations is charged from a source, not shown, through a line 1 together with substantially anhydrous HCl from a line 35 to reactor 2. This reactor is preferably a tower of design such that hydrochlorination of isobutylene and distillative separation of tertiary butyl chloride from unreacted hydrocarbons may be affected concomitantly. Isobutylene and the acid react according to the following equation to form tertiary butyl chloride:

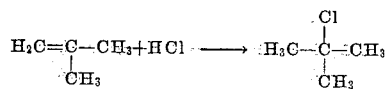

In the operation of this reactive and distillative step, the column 2 may be operated at pressures up to about 100 pounds per square inch with a feed inlet temperature of about 100° F. To insure adequate reflux for proper operation and to remove excess and unreacted HCl vapors at the top of the column are removed by way of an overhead line 3 and pass through the condenser 4 into the accumulator tank 5. Hydrogen chloride admixed with some hydrocarbon vapors is withdrawn continuously from the vapor section of the accumulator 5 by way of a line 6. This vapor is compressed by the compressor 7 and passed through a line 8 into the recycle HCl line 35. The condensed hydrocarbons which accumulate in the accumulator tank 5 are returned to the column 2 through a reflux line 9.

Since tertiary butyl chloride boils at a temperature some 100° F. higher than the hydrocarbon component in the reactor vessel, it will concentrate in the kettle while the lower boiling hydrocarbon components of the olefin containing stock concentrate in the upper section of the column. A liquid hydrocarbon-hydrogen chloride solution is withdrawn from a trap plate through a take off line 39 and passed to the stripping column 10. This stripper column is equipped with a reboiler coil 40 and is operated at a pressure substantially equal to that of the reactor column 2. A hydrogen chloride-rich overhead gas is taken from the stripper 10 and returned by way of a line 11 to the reactor column at a point above the take off tray. In this upper section and in the condenser 4 and accumulator 9 the HCl is further concentrated and returned by lines 6, 8 and 35 into the feed stock to the reactor 2 as hereinbefore stated. A butane-butene product free from isobutylene and hydrogen chloride is withdrawn from the reboiler section of this stripper and passed through a line 12 to such disposal as desired.

The tertiary butyl chloride formed in the reactor column 2 becomes concentrated in the kettle since a reboiler coil 41 furnishes heat for removal of the undesirable, more volatile constituents. Accordingly, relatively pure tertiary butyl chloride is removed from reactor column 2 through a line 13 and is transferred by pump 14 through a transfer line 15 and heater 16 into a decomposer and fractionator column 17. In this column dehydrochlorination and fractional distillation are carried out concomitantly. A stream of propane is also introduced into the column by way of a line 36. In order to provide adequate decomposition conditions for the t-butyl chloride, the column 17 is operated with a reboiler temperature of about 400° F., heat therefor being furnished by a reboiler coil 42. Pressure in the column is maintained at about 300 pounds per square inch.

The chloride upon entering the column flows downward and becomes substantially decomposed or dissociated so that the kettle material is an accumulation of relatively high boiling polymers. The dissociation products rise in the column and tend to recombine in the upper zone of lower temperature. At a point near the feed intake tray, propane is added through the line 36. However, little HCl recombines with the isobutylene since the former is rapidly removed from the zone of reaction by the high vapor pressure propane. The HCl and propane become concentrated at the top of the column and these mixed vapors are transferred by a vapor line 18 through the condenser 19 in which the propane is largely condensed. The condensate accumulates in the accumulator tank 20, from which the liquid consisting mainly of propane is returned to the column 17 by a return line 21. The quantity of propane returned to the column is governed by the rate of addition of the cooling water in condenser 19. The vapors removed from the vapor section of this accumulator by way of the vapor line 27 contain hydrogen chloride and propane and are ultimately led to an HCl purification step to be described hereinafter.

In decomposer vessel 17 there accumulates a high boiling polymer material which is ultimately discharged through a bottom line 24 to such disposal as desired.

Isobutylene as a liquid is withdrawn from the column 17 from a take-off tray through a line 22 and introduced into the top of the stripping column 23. In this stripping column reboiler heat from a coil 43 permits removal of a relatively pure isobutylene free from hydrogen chloride and propane. These latter materials return to the column 17 through a vapor line 25. The isobutylene passes through a line 26 to a storage, not shown, or other disposal as desired.

Feed to the propane-hydrogen chloride separation and recovery system is obtained from the vapor section of the accumulator tank 20 through line 27, compressor 28, line 29, condenser 30 and tank 31. Condensed propane containing dissolved HCl passes through a line 32 to the stripping column 33. This column is also provided with a reboiler coil 44 for maintaining a sufficiently high temperature so that propane free from HCl may be withdrawn from the kettle section of this stripper. The overhead vapors, rich in HCl are removed from the column through an overhead line 34 and join the material in line 29 just prior to passage through the condenser 30. The kettle product is continuously withdrawn through line 36 and passed to the column 17 for reuse as the HCl and isobutylene separating or spacing agent. Make-up propane may be added to the system through a line 45 provided therefor. Make-up HCl may be added to the HCl recycle line 35 through a line 37 provided expressly for addition or removal of HCl as needed.

I have found that by operating this HCl-propane recovery column at a pressure of about 400 pounds per square inch and with efficient cooling in the condenser coil 30 adequately concentrated hydrogen chloride may be withdrawn from the top of the accumulator tank 31 for recycle purposes in pipe 35.

When the tertiary olefin being separated is isobutylene, I prefer to maintain the kettle material in the decomposer column at a temperature of about 400° F. As mentioned hereinbefore, this kettle temperature will be dependent upon the particular olefin under treatment and somewhat upon the particular inert hydrocarbon spacing agent used. When separating tertiary olefins of 4 to 8 carbon atoms per molecule, kettle temperatures for decomposition of the corresponding tertiary olefin chlorides will vary from about 200° to a maximum of about 500° F., the lower temperatures being sufficient for the decomposition of the higher molecular weight chlorides since they are more easily decomposed than the lower molecular weight chlorides. The herein described tertiary butyl chloride kettle temperature may be carried at about 400° F. when using propane as a spacing agent. When separating isoamylenes, the $C_5$ tertiary olefins, butane may be used as the spacing agent since the latter boils at about 31° F. and the $C_5$ tertiary olefins boil at about 88° and 101° F., respectively. Thus for the higher boiling tertiary olefins correspondingly higher boiling spacing agents may be used, the main stipulation being that the spacing agent should preferably boil at least 20° to 25° F. below the lowest boiling olefin separated. Operating pressures need only be those required to maintain proper separation and fractionation conditions within the dissociator-fractionator tower.

In the application of this process to a butane-butene stream there is only one tertiary olefin and one tertiary alkyl chloride to be concerned with. Furthermore, the tertiary chloride formed upon hydrochlorination dissociates into only one olefin, isobutylene. In the handling of $C_5$ and higher streams, however, each fraction of substantially constant molecular weight handled will contain two or more tertiary olefins, and in some cases more than one tertiary alkyl chloride may be formed. Although substantially only tertiary olefins will react to form chlorides in the first step of the process, a given higher tertiary chloride can dissociate into more than one olefin, not all of which may be tertiary in character. The proportions of the various olefins formed will depend upon relative rates of reaction and upon the equilibrium conditions prevailing for the particular isomers under consideration. The olefins formed, however, will have the same carbon skeleton as found in the tertiary chloride dissociated and as the olefin originally occurring in the hydrocarbon fraction treated.

An example of the complex reactions taking place may be cited for the $C_5$ system. There are three isoamylenes which can be present in the $C_5$ fraction. The lowest boiling of the three, 3-methyl-1-butene (boiling point 68° F.) is not a tertiary olefin and its concentration in the more normal thermally and catalytically cracked streams is very small as compared to that of the other two isoamylenes. 2-methyl-1-butene (boiling point 88° F.) and 2-methyl-2-butene (boiling point 101° F.) are both tertiary olefins and will react readily to form the single compound, tertiary amyl chloride. The dissociation of this chloride, however, will yield all three of the isoamylenes mentioned above, although the lowest boiling of the three, 3-methyl-1-butene will be present in the product only to a very small extent. The 2-methyl-2-butene will predominate although its concentration in the product may be quite different from its relative concentration to 2-methyl-1-butene in the feed to the process.

In the handling of $C_6$ fractions the picture becomes much more complicated because there are several tertiary olefins which can form and a correspondingly larger number of dissociated olefins can result from dehydrochlorination. Furthermore certain branched chain olefins which are not tertiary in character, such as 2-methyl-3-pentene, are known to isomerize easily in the presence of acidic materials to the tertiary form 2-methyl-2-pentene, and this latter compound is known to react readily with HCl under the condition of this process. It is therefore possible for olefins not tertiary in character orginally, but which can become of the tertiary type by a simple shift in the double bond, to be removed by this process.

When using other spacing agents for the separation of HCl from another tertiary olefin than for the example herein described, the several stripper vessels will best be operated at such pressures and temperatures as will permit the desired separations and as understood by those skilled in such art.

For purposes of simplicity valves, controllers, pressure gauges, recorders and such auxiliary equipment are not shown. Their use is well known.

Since the hydrogen chloride is substantially anhydrous and the hydrocarbon feed stock dry also, corrosion of equipment is at a minimum and therefore, for the most part, ordinary, standard steel vessels, pipes, pumps and the like may be used.

Since the process, broadly, may be used for the separation of other isoolefins, as hereinbefore mentioned, pressures, and temperatures and other operating conditions may be varied to meet the particular problem at hand as will be understood by those skilled in the art.

Having disclosed my invention, what I desire to claim by Letters Patent is:

1. A process for separating and recovering isobutylene and a butane-n-butene mixture from a hydrocarbon stock containing these materials comprising the steps of contacting the hydrocarbon stock with hydrogen chloride to form tertiary butyl chloride, separating by fractional distillation and as bottoms, said tertiary butyl chloride, removing uncombined hydrogen chloride as fractionator overhead and recycling this hydrogen chloride into said contacting step, and removing a side stream from said fractionation step comprising a butane-n-butene mixture and some unreacted hydrogen chloride, separating the hydrogen chloride and returning same to the fractionation step and removing the butane-n-butene mixture as one product of the process; passing said fractionator bottoms comprising tertiary butyl chloride to a decomposer vessel, adding a spacing agent to said tertiary butyl chloride, decomposing said tertiary butyl chloride into an olefin and hydrogen chloride and separating these two decomposition materials by fractionation in the presence of said spacing agent having a boiling point 20° to 25° F. below that of the olefin, wherein said olefin is separated as one product and the spacing agent and hydrogen chloride are separated as a mixture, further separating said spacing agent from the hydrogen chloride, recycling the latter into the original contacting step, recycling the further separated spacing agent into the second separating operation, and removing the separated olefin as a product of the process.

2. The process of claim 1 wherein the original contacting step for the reaction of hydrogen chloride and isobutylene containing stock is carried out at a temperature of about 100° F., and the decomposition of the tertiary butyl chloride is carried out at a maximum temperature of about 500° F.

3. A process for separating and recovering isobutylene and a butane-n-butene mixture from a hydrocarbon stock containing these materials comprising the steps of subjecting said hydrocarbon stock and hydrogen chloride to distillation conditions at a pressure between the limits of 20 to 100 pounds per square inch, removing from the distillation step tertiary butyl chloride as bottoms, removing hydrogen chloride as a fractionator overhead and recycling this removed hydrogen chloride into the fractionation step, removing a side stream from said fractionation step comprising a mixture of butane, n-butene and some hydrogen chloride, separating the hydrogen chloride from the butane-n-butene mixture and returning this hydrogen chloride to said fractionation step and recovering the butane-n-butene mixture as one product of the process, subjecting said tertiary butyl chloride to a fractional distillation step at a pressure of about 300 pounds per square inch, adding a spacing agent having a boiling point from 20° to 25° F. below the boiling point of isobutylene to this latter distillation step, removing a mixture comprising isobutylene from this latter distillation step, recovering the isobutylene as a second product of the process, removing the spacing agent and hydrogen chloride mixture from the latter fractional distillation step, separating the hydrogen chloride from the spacing agent and returning the latter to said latter fractional distillation step and the separated hydrogen chloride to the first mentioned fractional distillation step.

4. The process of claim 3 wherein the first fractional distillation step is carried out at a maximum temperature of 100° F., and the latter fractional distillation step is carried out between the temperature limits of 200° to 500° F., and the spacing agent is propane.

WILLIAM W. WEINRICH.

REFERENCES CITED

The following references are of record in the file of this patent:

UNITED STATES PATENTS

| Number | Name | Date |
| --- | --- | --- |
| 2,181,642 | McMillan | Nov. 28, 1939 |
| 2,277,650 | Mueller-Cunradi et al. | Mar. 24, 1942 |
| 2,440,497 | Winning et al. | Apr. 27, 1948 |